US005563712A

United States Patent [19]

Nohata

[11] Patent Number: 5,563,712

[45] Date of Patent: Oct. 8, 1996

[54] IMAGE RECORDING APPARATUS WITH TRANSMISSION TIME SETTING FEATURE

[75] Inventor: Yukio Nohata, Yokohama, Japan

[73] Assignee: Canon Kabushiki Kaisha, Tokyo, Japan

[21] Appl. No.: 217,291

[22] Filed: Mar. 24, 1994

[30] Foreign Application Priority Data

| | | | |
|---|---|---|---|
| Mar. 26, 1993 | [JP] | Japan | 5-068244 |
| Mar. 3, 1994 | [JP] | Japan | 6-033540 |

[51] Int. Cl.$^6$ .............................. H04N 1/23; H04N 1/32; H04N 1/034

[52] U.S. Cl. .......................... 358/296; 358/404; 358/434; 347/3

[58] Field of Search .................................... 358/296, 401, 358/404, 406, 409, 412, 434, 468, 501, 502, 504; 347/3, 5, 19; 400/323

[56] References Cited

U.S. PATENT DOCUMENTS

| | | | |
|---|---|---|---|
| 4,247,872 | 1/1981 | Wada et al. | 358/443 |
| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,608,577 | 8/1986 | Hori | 346/140 R |
| 4,723,129 | 2/1988 | Endo et al. | 346/1.1 |
| 4,740,796 | 4/1988 | Endo et al. | 346/1.1 |
| 5,359,355 | 10/1994 | Nagoshi et al. | 347/9 |
| 5,373,368 | 12/1994 | Taniguro | 358/296 |

FOREIGN PATENT DOCUMENTS

| | | |
|---|---|---|
| 54-56847 | 5/1979 | Japan . |
| 59-123670 | 7/1984 | Japan . |
| 59-138461 | 8/1984 | Japan . |
| 60-71260 | 4/1985 | Japan . |

*Primary Examiner*—Peter S. Wong
*Assistant Examiner*—Eric Frahm
*Attorney, Agent, or Firm*—Fitzpatrick, Cella, Harper & Scinto

[57] ABSTRACT

Main scanning is performed by reciprocating a recording head having plural of recording elements. After the main scanning is completed, sub-scanning is performed by conveying the recording paper for a distance corresponding to the recording width of the recording head to record an image corresponding to received image data on the recording paper. At this time, the minimum transmission time for data is set in correspondence with the recording speed of the set recording mode. For example, a decision is made as to whether a one-direction recording mode or a bidirectional recording mode is set, and when the one-direction recording mode is set, the minimum transmission time for data is set to a time longer than that set in the bidirectional recording mode. This prevents overflow of memory for storing the received image data.

14 Claims, 8 Drawing Sheets

IMAGE RECORDING APPARATUS WITH TRANSMISSION TIME SETTING FEATURE

BACKGROUND OF THE INVENTION

1. Field of the Invention

The present invention relates to an image recording apparatus for recording an image corresponding to received image data on a recording medium by moving a recording head having a plurality of recording elements relative to the recording medium.

2. Description of the Related Art

An image recording apparatus has previously been known as this type of apparatus in which an ink jet recording head having a plurality of discharge openings and a plurality of recording elements, e.g., a plurality of heating elements, provided in correspondence with the discharge openings, is reciprocated for primary scanning relative to a recording medium by using a carriage, and, after the primary scanning is completed, the recording medium is conveyed for sub-scanning in the direction substantially at right angles to the primary scanning direction in accordance with the recording width. Such a recording apparatus is sometimes designed so that the user can freely select either a one-direction recording mode for recording during movement of the recording head in one of the reciprocation directions thereof, and a bidirectional recording mode for recording during movement of the recording head in both reciprocation directions thereof. Facsimile equipment using such a recording apparatus as a section for recording data transmitted through signal lines has also been proposed.

In this apparatus, when remarkable deviation occurs in dots during printing of ruled lines by bidirectional recording, a user may select the one-direction recording mode in order to improve the quality of the image recorded. However, when one-direction recording is set, the ink jet recording head must be returned to the printing start position after one block is completely printed by one primary scanning. The printing time is thus 1.2 to 1.5 times that of bidirectional recording.

Thus, even when the recording mode is set to either the one-direction recording made or the bidirectional recording mode, if the minimum transmission time declared by a receiver is the same, more time is required for recording data in image memory for storing received data therein in the one-direction recording mode. There is thus the problem that, when a great deal of data is received, the image memory easily overflows.

SUMMARY OF THE INVENTION

The present invention has been achieved in consideration of the above situation, and an object of the present invention is to provide an improved image recording apparatus.

Another object of the present invention is to provide an image recording apparatus which can prevent occurrence of an overflow of storage means for storing received data.

A further object of the present invention is to provide an image recording apparatus in which the minimum time of data transmission is changed in correspondence with the recording mode selected from a plurality of recording modes having different recording speeds.

A still further object of the present invention is to provide an image recording apparatus in which the minimum transmission time is set in accordance with the residual memory capacity of storage means for storing received data.

The above and other objects of the invention will be made clear from the description below.

DETAILED DESCRIPTION OF PREFERRED EMBODIMENTS

Embodiments of the present invention are described in detail below with reference to the accompanying drawings.

Figure 1:
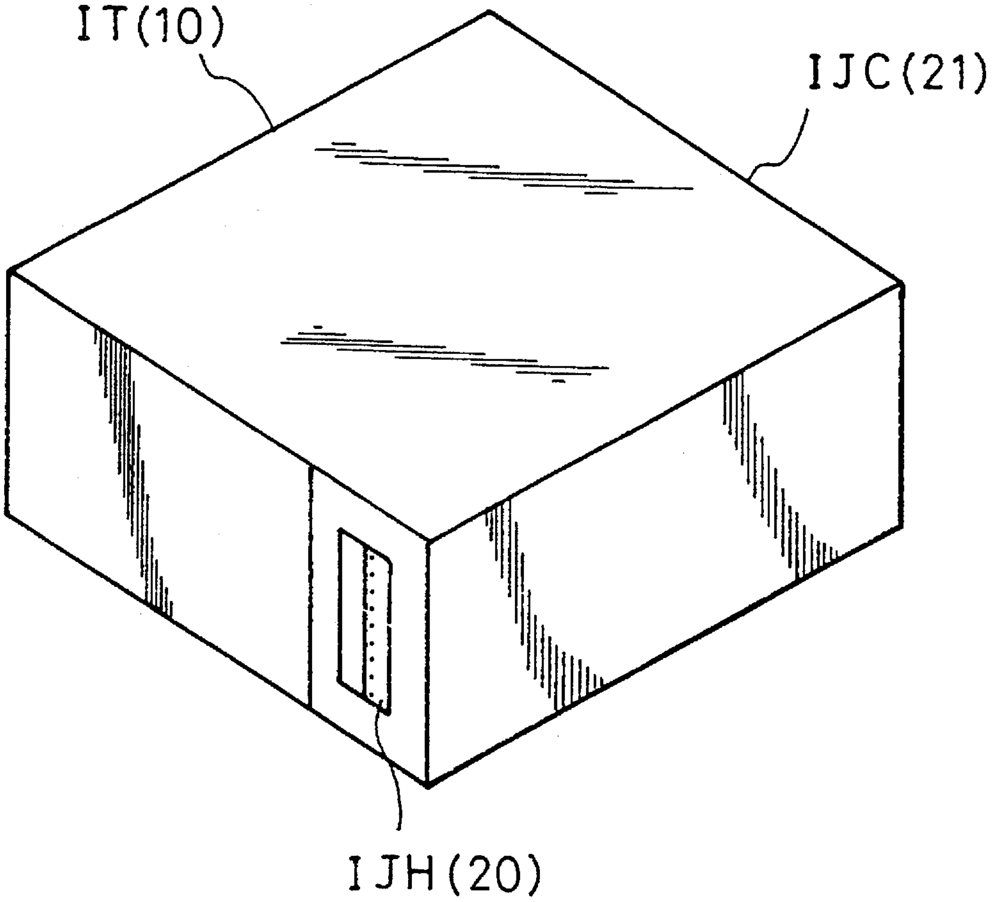
FIG. 1 is a perspective view illustrating an ink jet cartridge.
Figure 2:
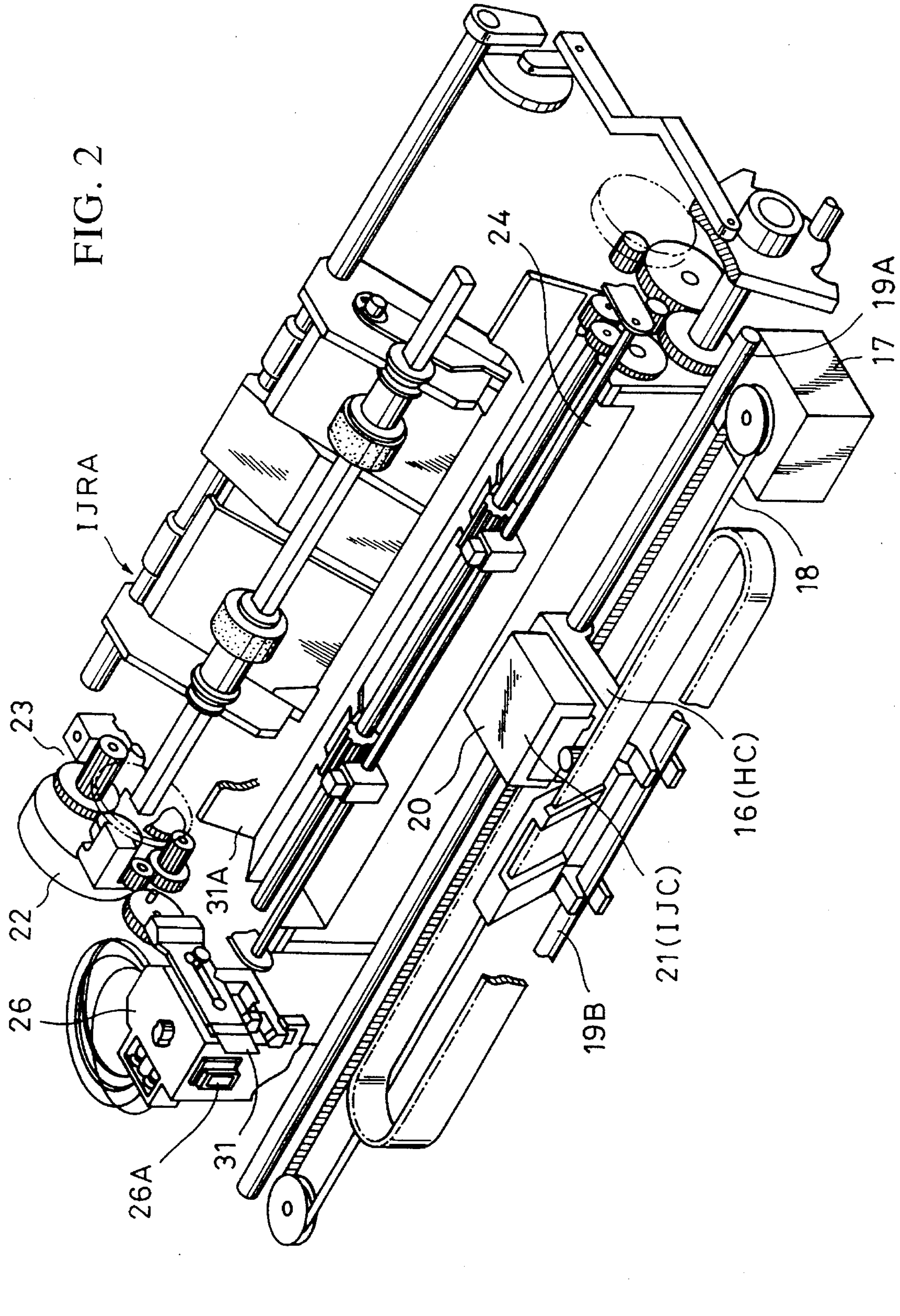
FIG. 2 is a perspective view illustrating an ink jet printer.

FIGS. 1 and 2 show an example of construction of an ink jet printer which is preferred as a recording system for a facsimile equipment to which the present invention is applied. In the drawings, IJH denotes an ink jet head (referred to as a "recording head" or simply as a "head" hereinafter) of the type in which ink is discharged to recording paper by using the bubbles generated by thermal energy; IJC, a detachable ink jet cartridge (referred to as a "cartridge" hereinafter) integral with the head IJH and provided with a tank IT for supplying ink to the head IJH; and IJRA, a body of an ink jet recording apparatus.

In this example, the cartridge IJC has a shape in which the tip of the head IJH is slightly projected from the front side of the ink tank IT, as shown in the perspective view of FIG. 1. The cartridge IJC is fixed and supported by a carriage HC mounted on the ink jet recording apparatus body IJRA which will be described below, and is a disposable type which is detachable from the carriage HC.

The ink tank IT for storing ink to be supplied to the head IJH comprises an ink absorber, a container for inserting the ink absorber therein, and a cover member for sealing the container, not all of which are shown in the drawings. The ink tank IT is filled with the ink, and supplies the ink to the head side in accordance with discharge of the ink.

The cartridge IJC configured as described above is detachably mounted on the carriage HC of the ink jet recording apparatus body IJRA, which will be described below, by a predetermined method. The relative movement between the carriage HC and a recording medium is controlled on the basis of the predetermined input recording signal to form a desired recorded image.

FIG. 2 is a perspective view illustrating the appearance of an example of the ink jet recording apparatus IJRA provided with a mechanism for the above-described processing.

In FIG. 2, reference numeral 20 denotes the head of the cartridge IJC having a nozzle group opposing the recording surface of the recording paper which was transferred onto a platen 24 so as to discharge the ink to the recording surface. Reference numeral 16 denotes the carriage HC for holding a recording head 20. The carriage HC is connected to a portion of a driving belt 18 for transmitting driving force of a driving motor 17 and is made slidable on the two guide shafts 19A and 19B arranged in parallel fashion so that the recording head 20 can be reciprocated over the whole width of the recording paper. During the reciprocating motion, the recording head 20 records an image corresponding to the received data on the recording paper. The recording paper is conveyed for a predetermined amount each time one main scanning is terminated, and sub-scanning is then performed.

Reference numeral 26 denotes a head recovery device which is disposed at an end of the movement course of the recording head 20, e.g., a position opposite to the home position. The head recovery device 26 is operated by the driving force of a motor 22 through a transmission mechanism 23 to cap the recording head 20. The ink is sucked (suction recovery) by appropriate suction means (for example, a suction pump) provided in the head recovery device 26 in connection with the capping of the recording head 20 by the cap portion 26A of the head recovery device 26. This causes discharge recovery processing for removing the thickened ink from the discharge nozzles. The recording head 20 is protected by capping at the end of recording. The discharge recovery processing is performed at the time of power charge or exchange of the recording head, the time the above operation is not performed for a predetermined time or more, or the like.

Reference numeral 31 denotes a blade as a wiping member made of silicone rubber and disposed on the side of the head recovery device 26. The blade 31 is held in a cantilevered manner by a blade holding member 31A, and is operated by the motor 22 and the transmission mechanism 23 in the same manner as the head recovery device 26 so as to permit engagement with the discharge surface of the recording head 20. This causes the blade 31 to engage the discharge surface of the recording head 20 with appropriate timing in the recording operation of the recording head 20 or after the discharge recovery processing using the head recovery device 26, and to wipe off dew drops, moisture, dust or the like from the discharge surface of the recording head 20.

Figure 3:
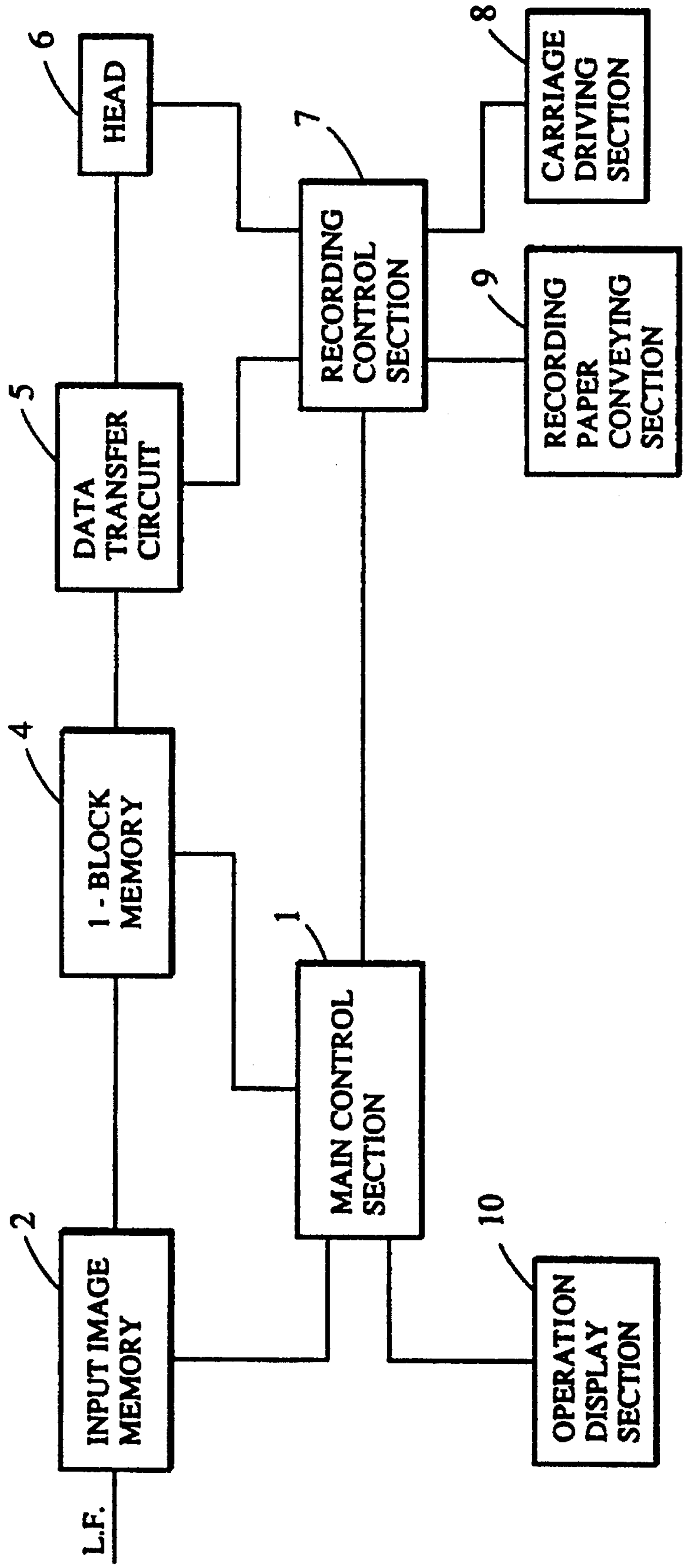
FIG. 3 is a block diagram illustrating a recording apparatus in accordance with a first embodiment of the present invention.

FIG. 3 is a block diagram illustrating a control system of a recording apparatus in accordance with a first embodiment of the present invention. In FIG. 3, reference numeral 1 denotes a main control section of this apparatus, which mainly comprises a known one-chip microcomputer for controlling the entire apparatus to transmit and receive data. Reference numeral 2 denotes an input image memory for inputting and storing information about an image to be recorded in accordance with the received data therein. The input image memory 2 transmits data in a raw form to a one-block memory 4.

The recording apparatus of this embodiment comprises a semimulti-type head having several tens of nozzles (in this embodiment, 64 nozzles with a resolution of 360 dpi) of the type in which ink droplets are discharged from the discharge openings by changing the state of the ink using thermal energy. The recording apparatus is the shuttle type in which information for one page is recorded on the recording paper by repeatedly scanning the head. The term "1 block" represents the amount of image data (64×3648 dots) for one main scan. Reference numeral 5 denotes a data transfer circuit for transferring image data to the head 6 (corresponding to the IJH 20 shown in FIG. 2), and reference numeral 7 denotes a recording control section comprising a one-chip microcomputer or the like. The recording control section 7 controls data transfer to the head 6 and driving of the head 6 and output control signals to a carriage driving section 8 for reciprocating the carriage 16 and a recording paper conveyance section 9. The carriage driving section 8 comprises a carriage motor and a motor driver, and the recording paper conveyance section 9 comprises a recording paper conveyance motor, e.g., a stepping motor or the like, for moving the recording paper for a length corresponding to the recording width in the sub-scanning direction at each end of one scanning, and a motor driver. Reference numeral 10 an operation display section comprising LED's or LCD's for showing the state of the recording apparatus, operation keys for setting various modes such as the one-direction recording mode, the bidirectional recording mode, etc. For example, when remarkable deviation occurs during bidirectional printing, the user can arbitrarily operate the operation display section 10 to set the one-direction recording mode. This display method may use either a hard switch such as a display switch or the like or a soft switch for setting by displaying on the LCD or the like. The head 16 has a temperature detector element such as a thermistor or the like for detecting the temperature of the head 16 therein. The pulse width of the head driving voltage is controlled on the basis of the output from the temperature detector element and the discharge hysteresis based on the past printing data, thereby stably discharging the ink.

Figure 4:
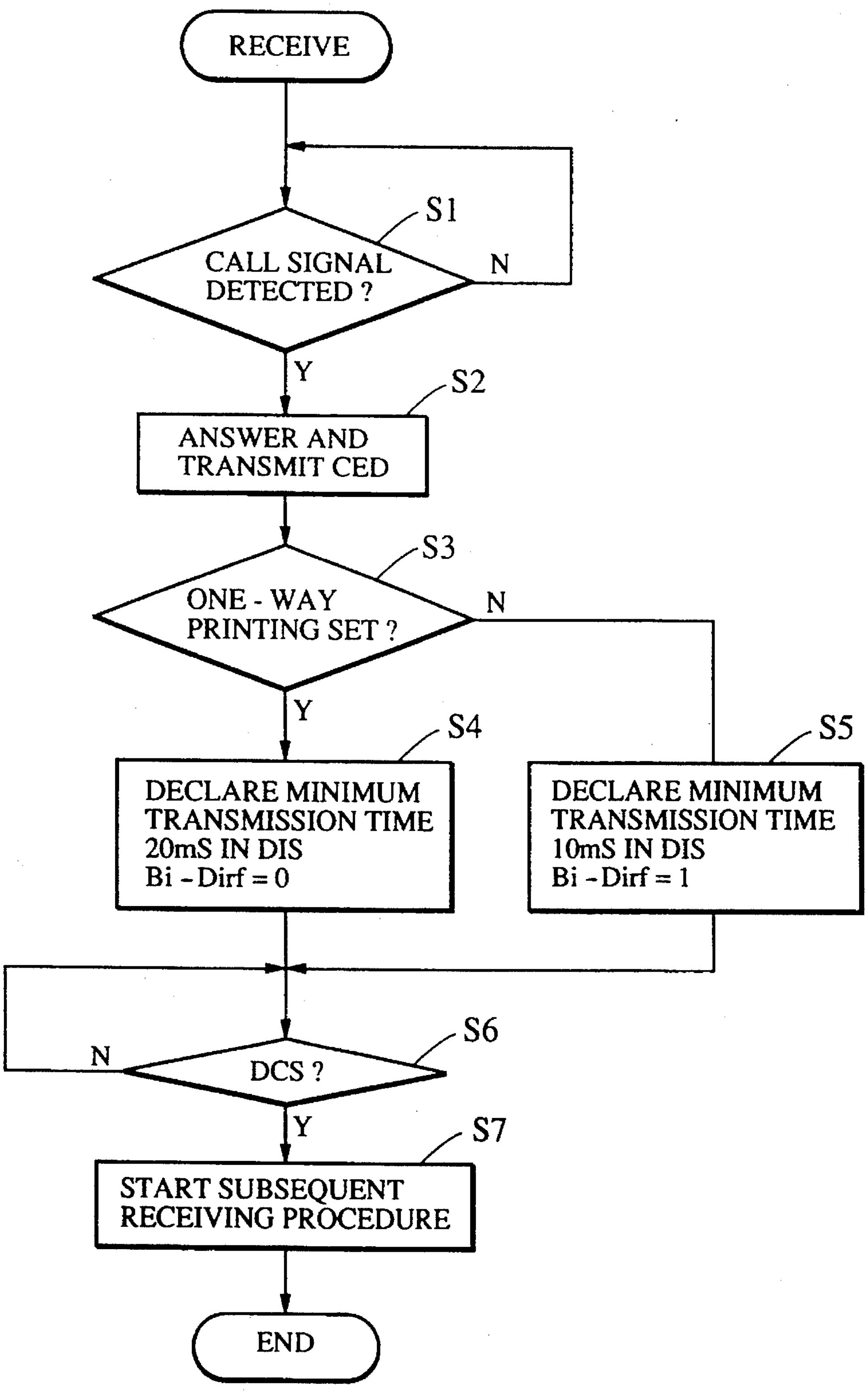
FIG. 4 is a drawing illustrating the operation of setting the minimum transmission time by a main control section.

FIG. 4 shows the flow of control when the main control section 1 receives a signal.

In this embodiment, the flow follows the binary procedure under CCITT standards. If a call signal from a transmitter side through lines is detected in Step S1, the flow advances to Step S2 of answering and transmitting CED as a called station identifying signal. The main control section 1 then checks setting in the operation display section 10 in Step S3. If the recording mode is set to the one-direction recording mode, the flow advances to Step S4 of declaring a minimum transmission time of 20 ms to the transmitter side in DIS which is an initial discrimination signal for transmitting the CCITT recommendation standard function. Further, the bidirectional recording flag Bi-DirF (below) which is present in a print command as a printing start signal output to the recording control section 7 is reset. If the recording mode is not set to the one-direction recording mode in Step S3, the flow advances to Step S5 of declaring a minimum transmission time of 10 ms in the DIS to the transmitter side, the bidirectional recording flag Bi-DirF is set, and DCS as a receiving command output from a receiver is waited in Step S6. The subsequent receiving procedure is performed in accordance with the procedure under the CCITT standards. Although, in this embodiment, the minimum transmission time for data is set to 10 ms and 20 ms in bidirectional recording and one-direction recording, respectively, the minimum transmission time may be set to any desired values. Although, the recording mode is set, the main control section 1 checks the content set by the user and informs the recording control section 7, the recording control section 7 may directly check the set content and inform the main control section 1 of the content.

Figure 5:
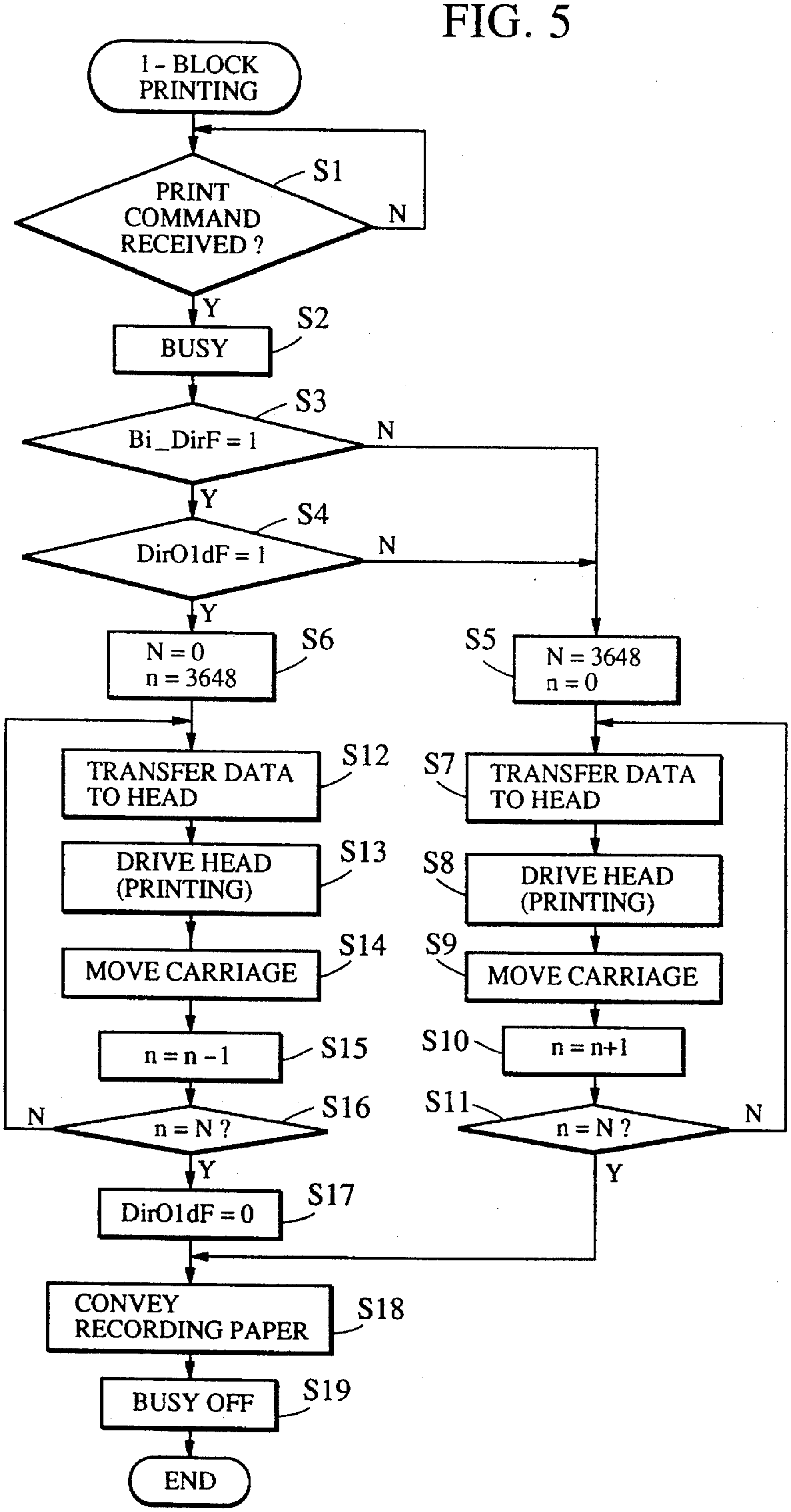
FIG. 5 is a flowchart illustrating recording processing for 1 block.

FIG. 5 is a flowchart showing the control operation by the recording control section for recording (printing) one block.

A decision is made in Step S1 as to whether or not the printing command is received from the main control section 1. When the printing command is received, it is assumed that raw data for one block was transferred from the input image memory 2 to the one-block memory 4. If it is decided in Step S1 that the printing command is received, a signal BUSY as a status signal is output to the main control section 1 in Step S2. A check is made in Step S3 to see if the flag Bi-DirF output from the main control section 1 indicates the setting of the bidirectional recording mode. This flag is set in the printing command by the main control section 1 in correspondence with setting in the operation display section 10 by the user. The flag is a reference flag for the recording control section 7, as described above. If the bidirectional recording flag Bi-DirF is reset, and if the one-direction recording mode is set, the flow advances to Step S5 of setting the counters N and n provided on the data transfer circuit 5 to 3648 and 0, respectively. The number 3648 corresponds to the number of dots on one line on recording with a resolution of 360 dpi in the B4 transverse direction (257 mm). The counter n indicates addresses of the one-block memory 4 for reading data therefrom. If the flag Bi-DirF is set in Step S3, and if the bidirectional recording mode is set, the flow advances to Step S4 of checking the printing direction of the previous block. In Step S4, a reference flag DirOldF is a flag for setting the printing direction for each block by the recording control section 7, and the main control section 1 has no concern in setting the reference flag. If the previous block is printed in the forward direction (DirOldF=1), the flow advances to Step S6 of setting the counters N and n to 0 and 3648, respectively, because printing of the present block is backward printing. The forward printing represents printing in the direction of one-direction printing. If it is decided in Step S4 that printing of the previous block is backward printing (DirOldF=0), the flow advances to Step S3 as in the case where the recording mode is set to the one-direction recording mode in Step S3. Data for one row (for 64 dots) of the head is then transferred in Step S7, and is printed in Step S8. After the ink is completely discharged for printing, the flow advances to Step S9 of moving the carriage 16 for one row. The address of the one-block memory 4 for reading data is the incremented in Step S10, and a decision is made in Step S11 whether or not n=N. If the decision result is Yes, printing of one block (3648×64 dots) is completed. If the result is No, the flow returns to Step S7 of transferring data for the next row in the block and printing the data.

Similarly, when it is decided in Step S4 that printing of the previous block is forward printing in the bidirectional recording mode, data for one row is printed in Steps S12 through S14. In this case, since printing of the block is backward printing, the counter n is decremented in Step S15, and a decision is made in Step S16 whether or not n=N. The direction of data reading from the one-block memory 4 is also backward. When n=N, the flag DirOldF is reset in Step S17, and the next block is forwardly printed. If it is decided in Steps S11 and 16 that printing of one block is completed, the recording paper is conveyed for one block in Step S18, and the BUSY signal is turned off in Step S19. The main control section 1 is informed that printing is completed, and recording for one block is terminated.

The above control operation is repeated a plurality of times to complete recording of an image for one page.

Embodiment 2

In Embodiment 1, the minimum transmission time declared to the transmitter side is changed in accordance with the set one-direction recording mode or bidirectional recording mode. However, when the recording apparatus side has a recording mode such as a so-called draft mode or the like in which drafted image data is transferred to the recording head, and printing is performed by using data with a low ratio of black data in order to decrease the consumption of the ink, since the recording speed is increased by printing in this draft mode, the minimum transmission time declared may be decreased when the recording apparatus is set to the draft mode by the operation section.

Figure 6:
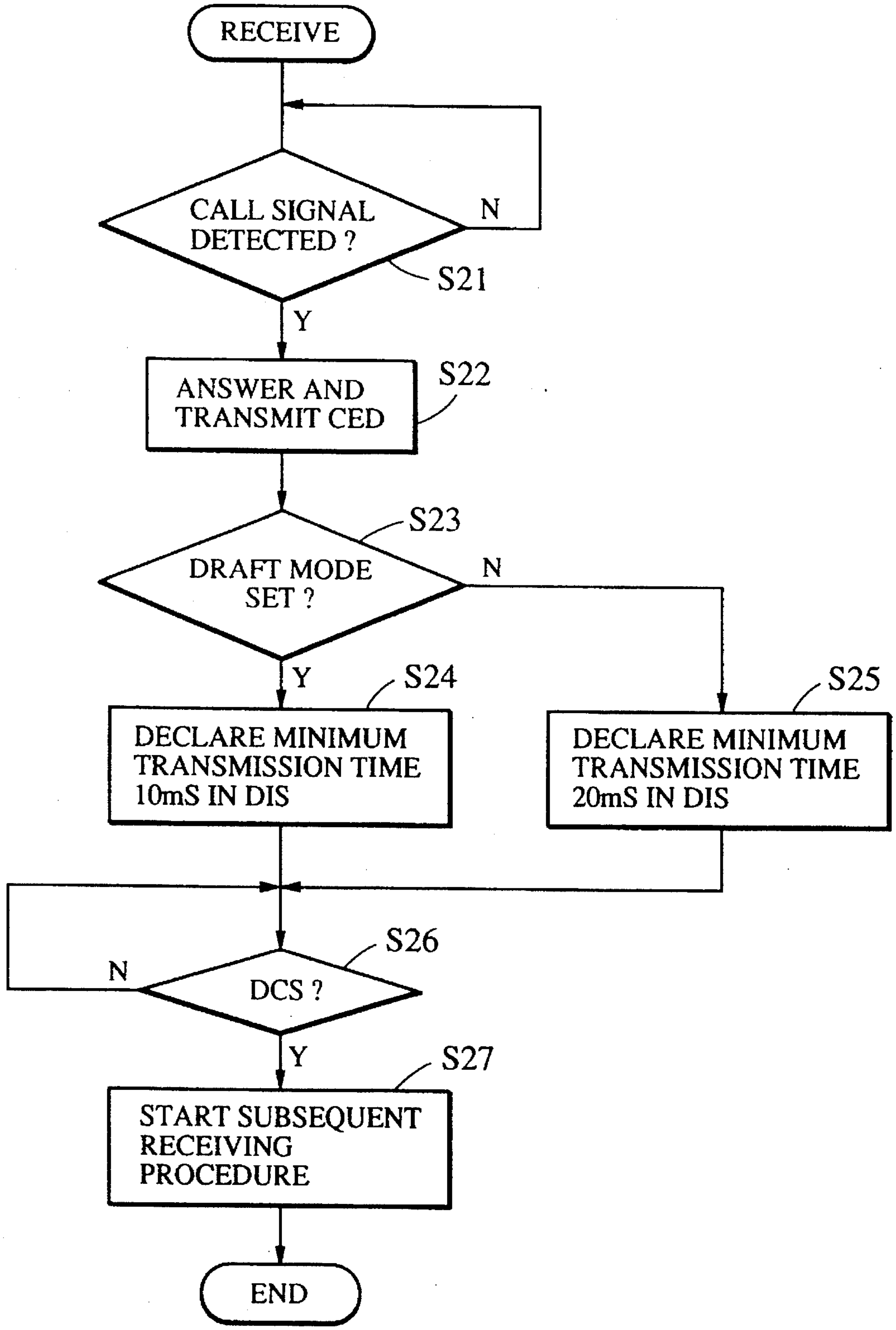
FIG. 6 is a flowchart illustrating receiving control in accordance with a second embodiment of the present invention.

FIG. 6 is a flowchart showing receiving control by the main control section 1 in accordance with this embodiment. Like the above-described embodiment, if a call signal output from the transmitter side is detected in Step S21, the flow advances to Step S22 of answering and transmitting CED as the called station discrimination signal. The main control section 1 then checks setting in the operation section 10 in Step S23. If the recording mode is set to the draft mode, since the time required for printing is short, the flow advances to Step S24 of declaring a minimum transmission time of 10 ms in the initial discrimination signal DIS to the transmitter side. If it is decided in Step S23 that the recording mode is not set to the draft mode, the flow advances to Step S25 of declaring the minimum transmission time of 20 ms in the DIS to the transmitter side. The flow then advances to Step S26 of waiting the DCS as the receiving command from the transmitter. The subsequent receiving procedure is performed in accordance with the CCITT standards.

The minimum transmission time may be determined by combination of the set one-direction recording mode or bidirectional recording mode and the set draft mode. In this case, the recording speed in combination of the draft mode and the bidirectional recording mode is highest.

Embodiment 3

Although, in Embodiments 1 and 2, the minimum transmission time declared to the transmitter side is changed in accordance with the set bidirectional recording mode or one-direction recording mode and the printing speed on the recording side in the draft mode, the minimum transmission time declared may be changed in accordance with the residual memory capacity of the input image memory 2.

Figure 7:
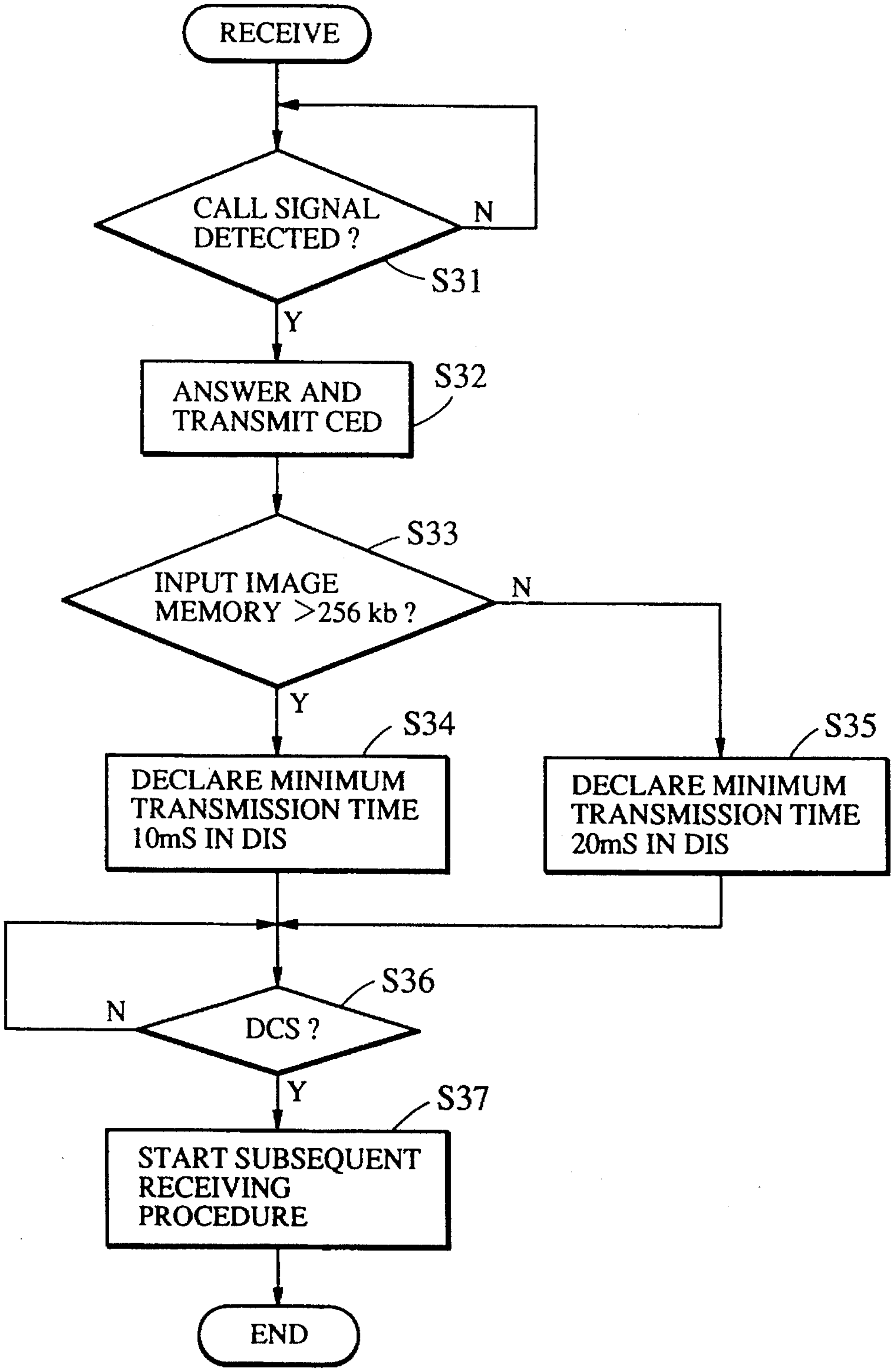
FIG. 7 is a flowchart illustrating receiving control in accordance with a third embodiment of the present invention.

FIG. 7 is a flowchart showing receiving control by the main control section 1 in accordance with Embodiment 3. Like the above-described embodiments, if the call signal output from the transmitter side is detected in Step S31, the flow advances to Step S32 of answering and transmitting the CED as the called station discrimination signal. The main control section 1 then checks the residual capacity of the input image memory 2 shown in FIG. 2 in Step S33. In this embodiment, the input image memory has a capacity of 512K-bytes. If the residual capacity of the input image memory is 256K-bytes or more, the flow advances to Step S34 of declaring the minimum transmission time of 10 ms to the transmitter side in the initial discrimination signal DIS, If the residual capacity of the input image memory 2 is 256K-bytes or less, the flow advances to Step S35 of declaring the minimum transmission time of 20 ms to the transmitter side in the DIS. Like the above embodiments, the flow then advances to Step S36 of waiting the DCS as the receiving command from the transmitter. The subsequent receiving procedure is performed in accordance with the CCITT standards.

The above configuration permits a longer minimum transmission time for data when the residual capacity of the input image memory 2 is small, and thus permits the receiving operation to proceed typically without causing overflow of the memory.

Embodiment 4

Although, in Embodiments 1 and 2, the minimum transmission time declared to the transmitter is changed in accordance with setting of the bidirectional recording mode or the one-direction recording mode and the printing speed on the recording side in the draft mode or the like, the minimum transmission time declared may be changed in accordance with combination of the residual capacity of the input image memory 2 described above in Embodiment 3 and the set recording speed.

Figure 8:
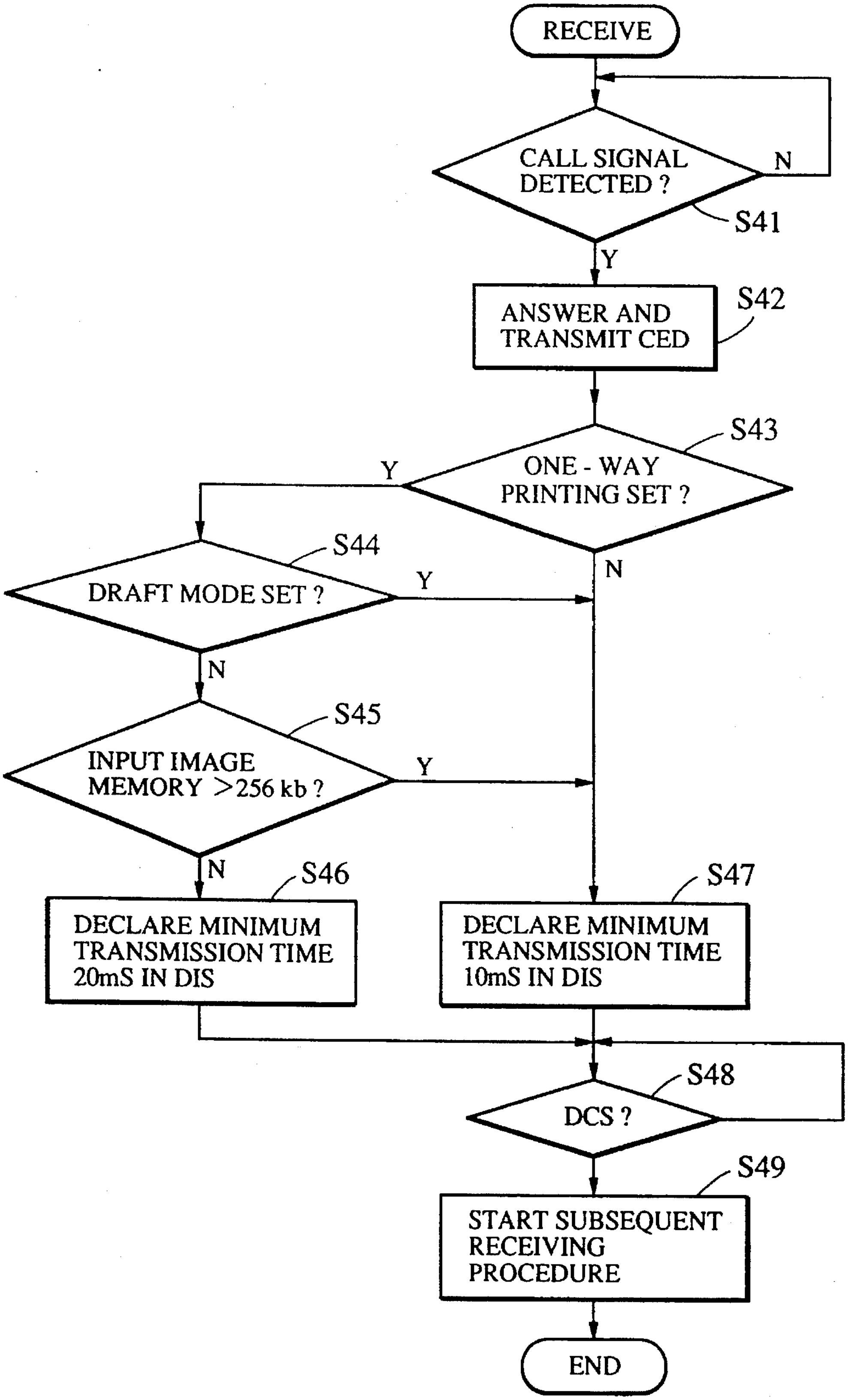
FIG. 8 is a flowchart illustrating receiving control in accordance with a fourth embodiment of the present invention.

FIG. 8 is a flowchart showing receiving control by the main control section 1 in accordance with Embodiment 4. Like the above embodiments, if the call signal output from the transmitter side is detected in Step S41, the flow advances to Step S42 of answering and transmitting the CED as the called station discrimination signal. A check is then made in Step S43 to see if one-direction recording is set. If one-direction recording is not set, the flow advances to Step S47 of declaring the minimum transmission time of 10 ms in the initial discrimination signal DIS. If it is decided in Step S43 that the one-direction recording is set, the flow advances to Step S44 of checking to see if the draft mode is set. If the draft mode is set, the flow advances to step S47 of declaring the minimum transmission time of 10 ms in the DIS. If the draft mode is not set in Step S44, the flow advances to Step S45 of checking the residual capacity of the input image memory 2 shown in FIG. 3. In this embodiment, it is assumed that the capacity of the input image memory 2 is 512K-bytes. If the residual capacity of the input image memory 2 is 256K-bytes or more, the flow advances to Step S47 of declaring the minimum transmission time of 10 ms in the DIS. If the residual capacity of the input image memory 2 is 256K-byte or less in Step S45, the flow advances to Step S46 of declaring the minimum transmission time of 20 ms in the DIS. Namely, only when the one-direction recording is set, and when the draft mode is not set, i.e., only when the recording speed is lowest, is the residual capacity of the image memory 2 is checked. Only when the residual capacity is 256K-bytes or less is time the minimum transmission time of 20 ms is declared. After the DIS is transmitted, the flow advances to Step S48 of waiting the DCS as the receiving command from the transmitter. The subsequent receiving procedure is performed in accordance with the CCITT standards.

In addition, when the recording speed is lower than the receiving speed during reception of a great deal of original data, and when the residual capacity of the input image memory 2 controlled by the main control section 1 is a predetermined value or less, the minimum transmission time can be changed for preventing overflow of the image memory. In this case, when the amount of original data received is small, since the minimum transmission time declared is short, the time required for communication with the transmitter side may be decreased.

As described above, the minimum transmission time declared to the transmitter side is changed in accordance with the set recording mode of the recording apparatus or the residual capacity of the input image memory or both the recording mode and the residual capacity of the input image memory so that the receiving operation can be performed with typically causing overflow of the image memory.

Although each of the above embodiments relates to an example of recording apparatuses in the ink jet recording system in which ink droplets are scatteringly formed by utilizing thermal energy, among various ink jet recording systems, the basic principles disclosed in, for example, U.S. Pat. Nos. 4,723,129 and 4,740,796, are preferably used for typical construction and principles. This system can be applied to both the so-called on-demand type and continuous type. Particularly, in the case of the on-demand type, the thermal energy is generated in an electrothermal converter disposed opposite to a sheet holding a liquid ink) or a liquid passage by applying, to the electrothermal converter, at least one driving signal for proving a rapid temperature rise beyond a boiling point in accordance with recording information to produce film boiling on the thermal working surface of the recording head. As a result, bubbles can effectively be formed in the liquid (ink) in one-to-one correspondence with the driving signal. The liquid (ink) is discharged from the discharge opening due to growth and shrinkage to form at least one droplet. Since the driving signal in a pulse form causes instantaneous appropriate growth and shrinkage of bubbles and can thus achieve discharge of the liquid (ink) with excellent responsibility, it is more preferable.

The driving signals disclosed in the specifications of U.S. Pat. Nos. 4,463,359 and 4,345,262 are suitable as the driving signal in a pulse form. When the conditions disclosed in the specification of U.S. Pat. No. 4,313,124 disclosing an invention which relates to a ratio of temperature rise of the thermal working surface are employed, better recording can be performed.

The combination of the discharge opening, the liquid passage (linear liquid passage or right angle liquid passage) and the electrothermal converter, which is disclosed in each of the above specifications, and the constructions disclosed in U.S. Pat. Nos. 4,558,333 and 4,459,600 in which the thermal working surface is disposed in a curved region may be used as the construction of the recording head.

The construction disclosed in Japanese Patent Laid-Open No. 59-123670 in which a slot common to a plurality of electrothermal converters is used as a discharge portion of the electrothermal converters, and the construction disclosed in Japanese Patent Laid-Open No. 59-138461 in which an opening for absorbing the pressure wave of thermal energy is caused to correspond to a discharge portion may also be used.

Either of a construction comprising a combination of a plurality of recording heads which satisfies the length of a maximum recording medium, as disclosed in the above specifications, and a construction comprising a single recording head integrally formed may be used as a full-line type recording head having a length corresponding to the width of the maximum recording medium which allows recording by the recording apparatus.

In addition, the present invention is effective for a case using an interchangeable chip type recording head which permits electrical connection with the apparatus body and supply of ink therefrom when being mounted thereon, or a case using a cartridge type recording head having an ink tank integrally provided on the recording head.

It is also preferable to add recovery means, preliminary auxiliary means and the like to the recording head because the effect of the present invention can be further stabilized. Examples of such means added to the recording head include capping means, cleaning means, pressure or suction means, and an electrothermal converter, another heating element or pre-heating means comprising combination thereof. A preliminary discharge mode for discharging ink separately from recording is also effective for stable recording.

Although the aforementioned embodiments of the present invention use a liquid ink, an ink which is solidified at room temperature or less and which is softened or liquid at room temperature, an ink which is liquid during application of the recording signal used may be used because, in the ink jet recording system, the temperature of the ink itself is generally controlled within the temperature range of 30° C. to 70° C. so that the viscosity of the ink is within the range of stable discharge.

Further, the energy of the change in state from the solid state to the liquid state of ink may positively be used for preventing the temperature rise caused by thermal energy, or an ink which is solidified when being allowed to stand may be used for preventing evaporation thereof. In any case, an ink which is not liquefied until thermal energy is applied, e.g., an ink which is liquefied by applying thermal energy corresponding to the recording signal and discharged as a liquid ink, or an ink which has already begun to solidify when reaching the recording medium, may be used. In this case, the ink may be held in a liquid or solid form by recesses or through holes of a porous sheet and opposed to the electrothermal converter, as disclosed in Japanese Patent Laid-Open No. 54-56847 or 60-71260. It is most effective for each of the above inks to execute the film boiling system.

The present invention can be applied to not only an ink jet system utilizing thermal energy but also an ink jet system utilizing a piezo element or the like.

What is claimed is:

1. An image recording apparatus for recording an image corresponding to received image data on a recording medium by moving a recording head having a plurality of recording elements relative to said recording medium, said recording apparatus comprising:

recording mode setting means for setting a desired recording mode from a plurality of recording modes having different recording speeds; and transmission time setting means for setting a minimum transmission time for transmitting data in correspondence with the desired recording mode set by said recording mode setting means.

2. An image recording apparatus according to claim 1, wherein said recording head is reciprocable in two directions along a reciprocation path and said recording mode setting means sets either of a one-direction recording mode for recording in one of said two directions of reciprocation of said recording head, and a bidirectional recording mode for recording in both of said two directions of reciprocation.

3. An image recording apparatus according to claim 2, wherein when said one-direction recording mode is set by said recording mode setting means, said transmission time setting means sets said minimum transmission time to be longer than said minimum transmission time set in said bidirectional recording mode.

4. An image recording apparatus according to claim 1, wherein when said recording mode setting means sets a draft recording mode for recording draft image data, said transmission time setting means sets said minimum transmission time to a small value.

5. An image recording apparatus according to any one of claims 2 to 4, further comprising storage means for storing received image data so that said transmission time setting means also sets said minimum transmission time in accordance with a data storage state of said storage means.

6. An image recording apparatus according to claim 5, wherein said recording head discharges ink droplets by utilizing energy generated by said recording elements to record said image on said recording medium.

7. An image recording apparatus according to claim 6, wherein said recording head changes a state of the ink by utilizing thermal energy generated by said recording elements to discharge ink droplets.

8. An image recording apparatus according to any one of claims 1 to 4, wherein said recording head discharges ink droplets by utilizing energy generated by said recording elements to record said image on said recording medium.

9. An image recording apparatus according to claim 8, wherein said recording head changes a state of the ink by utilizing thermal energy generated by said recording elements to discharge ink droplets.

10. An image recording apparatus for recording an image corresponding to received image data on a recording medium by using a recording head having a plurality of recording elements, comprising:

storage means for storing said received image data;

driving means for driving said recording head in accordance with the image data stored in said storage means; and transmission time setting means for setting a minimum transmission time for transmitting image data in accordance with a residual memory capacity of said storage means.

11. An image recording apparatus according to claim 10, further comprising moving means for reciprocating said recording head in two directions along a reciprocation path relative to said recording medium so that an image is recorded on said recording medium during at least one of forward and backward movement of said recording head, which is moved by said moving means.

12. An image recording apparatus according to claim 10, wherein when the residual memory capacity of said storage means is smaller than a predetermined amount, said transmission setting means sets said minimum transmission time to be longer than that set when the residual memory capacity is greater than the predetermined amount.

13. An image recording apparatus according to any one of claims 10 to 12, wherein said recording head discharges ink droplets by utilizing energy generated by said recording elements to record an image on said recording medium.

14. An image recording apparatus according to claim 13, wherein said recording head changes a state of the ink by utilizing thermal energy generated by said recording elements to discharge ink droplets.

* * * * *

UNITED STATES PATENT AND TRADEMARK OFFICE
CERTIFICATE OF CORRECTION

PATENT NO. : 5,563,712

DATED : October 8, 1996

INVENTOR(S) : YUKIO NOHATA

It is certified that error appears in the above-identified patent and that said Letters Patent is hereby corrected as shown below:

AT [57] ABSTRACT

Line 3, "plural of" should read --plural--.

DRAWING SHEET 5 OF 8

FIG. 5, "Bi_DirF = 1" should read --Bi-DirF = 1"

COLUMN 1

Line 42, "made" should read --mode--.

COLUMN 2

Line 16, "1 block;" should read --one block;--.

COLUMN 4

Line 13, "10" should read --10 represents--.

COLUMN 5

Line 38, "the incremented" should read --incremented--.

COLUMN 6

Line 51, "DIS," should read --DIS.--.

UNITED STATES PATENT AND TRADEMARK OFFICE
CERTIFICATE OF CORRECTION

PATENT NO. : 5,563,712

DATED : October 8, 1996

INVENTOR(S) : YUKIO NOHATA

Page 2 of 2

It is certified that error appears in the above-identified patent and that said Letters Patent is hereby corrected as shown below:

COLUMN 7

Line 34, "2 is" should read --2--.
Line 35, "is time" should read --is--.
Line 36, "is" should be deleted.

COLUMN 8

Line 1, "ink)" should read --(ink)--.

Signed and Sealed this

Fourth Day of March, 1997

Attest:

Bruce Lehman

BRUCE LEHMAN

*Attesting Officer*

*Commissioner of Patents and Trademarks*